3,785,966
METHOD FOR DISCHARGING PARTICULATE SOLID FROM HIGH PRESSURE VESSEL

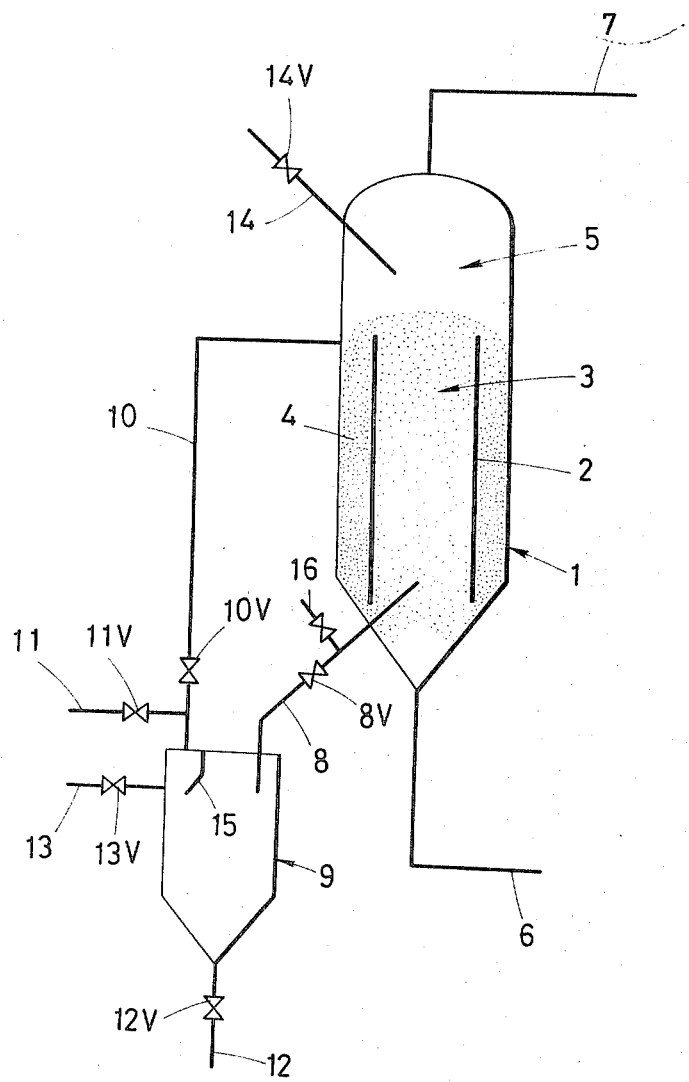

Yutaka Oguchi and Junichi Kubo, Tokyo, and Shinji Goto, Yokohama, Japan, assignors to Agency of Industrial Science and Technology, Tokyo, Japan
Filed Apr. 8, 1971, Ser. No. 132,286
Int. Cl. C10g 23/00, 25/06
U.S. Cl. 208—213     4 Claims

ABSTRACT OF THE DISCLOSURE

An improved method is disclosed for discharging particulate solids from a high pressure vessel, which method is characterized by maintaining said particulate solids in fluidized state in admixture with fluids and thus keeping the head of the particulate solid-fluid admixture in the vessel and its pressure differential greater than the head of a conduit conducting the fluid.

---

This invention relates a method for discharging from a high pressure vessel particulate solids maintained in fluidized state.

In cases where the operating plant system is not held under elevated pressure, particulate solids such as for example catalyst may be withdrawn from the vessel via a valved conduit extending from the lower portion of the vessel and into a suitable solids receptacle. A typical example is seen in FCC unit (apparatus for fluidized catalytic cracking of petroleum fractions). However, where such particulate solids are to be discharged at a high pressure differential, special considerations will be required to safeguard the plant equipment. If such methods as are practiced in the FCC unit are employed for discharging particulate solid-fluid mixtures at a high pressure differential from high pressure vessels directly to low pressure sections of the plant system, withdrawal conduits and valves in particular downstream of the vessels are prone to damage by the erosive action of the discharged mixtures. It is furthermore difficult to control the removal of a desired amount of particulate solids due to a high pressure differential between the reaction vessel and the solids receptacle.

To preclude the above-noted difficulties, special methods and means have been introduced, e.g. as disclosed in U.S. Pat. 3,410,791 wherein particulate solids in mixture with fluids are discharged from a high pressure vessel and passed into a fluid-solid separation zone or pot where the solid particles are accumulated and the separated fluid is vented from the pot to a point downstream thereof where the pressure is relative low.

This prior-art method has the drawback that the portion of the particulate solid which has failed to be separated tends to entrain with the fluid, pass into conduits downstream of the high pressure vessel and invite operating failure of pumps, temperature and pressure recorders or like instruments.

Whereas, it is the primary object of the present invention to provide an improved method which will eliminate the above drawback encountered in the prior-art method.

In accordance with the invention, there is provided a method for discharging particulate solids maintained in fluidized state and in admixture with fluids for example liquids, and gases-liquid mixture within a high pressure vessel, which method essentially comprises; withdrawing said admixture to a particulate solid separation zone located under said high pressure vessel wherein the particulate solids are settled and separated from the fluid; recycling the separated fluid to the upper portion of said vessel until a predetermined amount of particulate solids has accumulated in said separation zone; discontinuing said withdrawal of the admixture from the vessel and said recycle of the fluid; and subsequently recovering the particulate solids accumulated in said separation zone.

The method according to the invention may be best carried into practice by means hereafter described and illustrated in the accompanying drawing which is, however, not limiting, but only illustrative.

We have ascertained the fact that the apparatus shown will permit easy separation of particulate solids maintained in fluidized contact with fluids in a solid-fluid separation tank and more importantly allow recycling of the separated fluids back to the upper portion of high pressure reaction vessel without the aid of external pressure as from a pump.

This is accomplished because the head of the particulate solid-fluid admixture in the high pressure vessel and its pressure differential are greater than the head of the conduit conducting the fluid therethrough due to pressure loss of the particulate solid encountered by its fluidization. It will be thus understood that should separation of the solid-fluid mixture be not complete in the separation tank, all unseparated solid particles may be entrained with venting fluids and returned to the reaction vessel, thereby precluding the fear of particulate solids entering into strategic points downstream of the vessel and hence eliminating the problems of plugging of pipes and valves. It will be further appreciated that in the event abnormalities or operating troubles are encountered in the plant system during operation of the discharge of particulate solid-fluid mixtures from high pressure vessels, harmful solid particles are prevented from passing into conduits downstream of the high pressure vessel. The diameters of the solid particles applicable to the method of the invention generally are on the order of 0.05 mm. to 10 mm., preferably 0.2 mm. to 5 mm.

The method according to the invention finds industrial application as for example in the discharge of deactivated catalysts used in the hydrodesulfurization of heavy oil.

Various processes for the hydrodesulfurization of heavy oil have been developed, but they suffer from the contamination of catalysts by asphalten, metal components such as nickel and vanadium and other contaminating materials contained in the heavy oil. This problem may be alleviated to some extent by employing catalysts maintained in fluidized state so that deactivated catalysts may be replaced with fresh catalysts without having to discontinue the operation of the desulfurization equipment. However, the reaction vessel employed for hydrodesulfurization of heavy oil is ordinarily operated under elevated pressure and temperature conditions (e.g. 30–350 kg./cm.$^2$; 250°–500° C.), where it becomes difficult to discharge deactivated catalysts safely and at a desired rate. That is to say, a discharge of deactivated catalyst from a high pressure zone to a low pressure zone would entail erosion of pipes and valves and invite rapid pressure fluctuation in the high pressure reaction vessel, making it difficult to control the rate of discharge.

These difficulties will be eliminated by the improved method of the invention wherein a particulate catalyst and heavy oil mixture is discharged from a reaction vessel to a catalyst separation tank at a relatively low pressure differential, and the velocity of the mixture is thereby reduced.

A fuller understanding of the invention will be had from the detailed description that follows with reference to the accompanying drawing.

In the drawing, there is schematically shown an apparatus embodying the invention for discharging the particulate solid catalyst which is fluidized and passed upwardly within an inner column in a double-wall tube high pressure vessel wherein heavy oil is catalytically hydrodesulfurized.

The reaction vessel 1 contains a desulfurization catalyst in its lower section and is normally operated at 250°–500° C. and 100–350 kg./cm.$^2$. A mixture of heavy oil and hydrogen-containing gas is conducted through conduit 6 into the bottom of the reaction vessel 1 and passed upwardly through a hydrodesulfurization reaction zone 3 in the inner column 2 while causing the catalyst therein to become fluidized. The desulfurization reaction proceeds primarily in the reaction zone 3 of the vessel 1. The admixture of heavy oil, hydrogen-containing gas and catalyst enters into a catalyst separation zone 5 at the upper end portion of the inner column. Since the catalyst separation zone 5 is greater in section area than the inner column 2, the velocity of heavy oil flowing upwardly in the vessel 1 is held sufficiently low to prohibit entrainment of the catalyst and allow the same to settle in a catalyst settling zone 4 formed between the outer wall of the inner column 2 and the inner wall of the reaction vessel 1. With this arrangement, the catalyst accumulated in the lower portion of the zone 4 moves past clearance between the lower end of the inner column 2 and the lower section of the vessel 1, comes again in contact with the oil-gas mixture and flows upwardly through the desulfurization reaction zone 3.

The oil-gas mixture separated from and substantially free of catalyst in the catalyst separation zone 5 continues to ascend until it is withdrawn from the vessel 1 through conduit 7.

Designated at 8 is a catalyst discharge conduit extending from the lower section of the vessel 1 to a particulate solids (catalyst) separation tank 9, which is located under said vessel 1. When discharging deactivated catalyst from the vessel 1, it is preferred that the tank 9 is filled with gas oil, kerosene or similar liquids supplied as from a pipe 13, or alternatively the tank 9 is maintained under a pressure substantially equal to that in the vessel 1. In this manner, the catalyst-oil admixture may be introduced via conduit 8 into the catalyst separation tank 9 by first closing valve 13V, and opening valve 8V and valve 10V. The catalyst settles in the tank 9 and the heavy oil returns via conduit 10 (fluid passage) to the upper portion of said reaction vessel 1. Return of the heavy oil through conduit 10 is made possible by the fact that the pressure differential between the top and bottom of the reaction vessel 1 is held greater than the pressure differential of the liquid column of heavy oil in the conduit 10 owing to catalyst density and pressure loss from fluidization of the catalyst.

According to the method of the invention wherein the heavy oil separated from the catalyst in the tank 9 is recycled to the upper portion of the reaction vessel 1, the pressure differential between the vessel 1 and the tank 9 is held to a minimum thereby rendering it possible to control the velocity of the catalyst-oil admixture flowing through conduit 8 and valve 8V. Should the separated heavy oil stream contain some unseparated catalyst, such catalyst particles are directed together with the heavy oil to the vessel 1 through conduit 10 and hence will not cause undesirable plugging in pipes and valves downstream of the vessel 1.

When the catalyst has been accumulated to a predetermined level in the tank 9, the valves 10V and 8V are closed and valve 11V opened to reduce the pressure in the tank 9 to atmospheric, in which instance if necessary the catalyst may be withdrawn via line 12 by opening the valve 12V with kerosene or gas oil fed from conduit 13.

When closing the valve 8V, there may be supplied some fluid such as hydrogen or other gas free of particulate solids from line 16 to conduit 8, such fluid medium being of higher pressure than the pressure in vessel 1 to prevent solid catalyst articles from becoming clogged in the valve 8V.

The amount of catalyst settling in the catalyst separation tank 9 may be measured as for example by means of gamma-ray permeation from outside the tank. It will be understood, however, that when the catalyst has accumulated up to the level of the terminal end of conduit 8 that opens into the tank 9, discharge of the catalyst-oil mixture from the vessel 1 will virtually stop. At this time point, the discharge operation may be set to discontinue.

A baffle plate 15 is provided for presenting excessive catalyst patricles from entraining with the fluid into fluid passage of conduit 10. A line 14 is provided for supplying fresh catalyst to the vessel 1 in an amount substantially equal to the deactivated catalyst discharged.

EXAMPLE

The discharge operations were conducted with an apparatus of the following particulars:

Reaction vessel: 400 cm. high; 26 cm. in inside diameter
Inner column: 350 cm. high; 16.5 cm. in inside diameter
Catalyst separation tank: 8 liters in capacity
Catalyst discharge conduit: 2 cm. in inside diameter
Fluid passage: 2 cm. in inside diameter As shown in the drawing, the catalyst discharge conduit 8 was connected at one end to the vessel 1, more specifically with said one end extending centrally into the interior of the vessel 1 at a point about 40 cm. above the bottom thereof, and at the other end extending past valve 8V into the separation tank 9. The fluid passage or conduit 10 extends from the upper portion of the tank 9 past valve 10V to the vessel 1, more specifically at a point about 25 cm. below the top thereof.

The desulfurization catalyst and the reaction conditions were as follows:

Desulfurization catalyst: 1.00–0.35 mm. in particle size, averaged at 0.56 mm. in diameter; 1.58 g./cc. apparent specific gravity; 110 liters used
Feed oil: Normal pressure distillation residual oil of Khafji crude oil
Flow rate (based on the superficial velocity in the inner column):

|  | Cm./sec. |
|---|---|
| Oil | 43 |
| Hydrogen | 1.0 |

Reaction temperature: 370°–395° C.
Reaction pressure: 200 kg./cm.$^2$.

The catalyst separation tank 9 was initially filled with kerosene. The valve 10V in conduit 10 was opened, then the valve 8V in discharge conduit 8 was opened to initiate the discharge operation. After a lapse of 10 minutes, these valves were closed, and the separation tank 9 was brought to atmospheric pressure, followed by removal of the accumulated catalyst from the tank 9 with a supply of kerosene to the tank 9. The amount of catalyst removed was 3 liters.

This discharge operation test was conducted by 30 times, but any errosion of the valve 8V and the catalyst discharge conduit was not seen.

What is claimed is:

1. A method for removing a refined liquid from a high pressure vessel and for discharging intermittently a particulate solid maintained in fluidized state and in admixture with liquid and a gas within said high pressure vessel, said high pressure vessel having an intermediate reaction zone and an upper separation zone in which said particulate solid separates from said liquid and gas thus creating a density differential between the top and the bottom of said high pressure vessel for recycling said liquid into said high pressure vessel, which comprises (1) withdrawing a predetermined amount of said solid with liquid admixture to a particulate solid separation vessel located under said high pressure vessel, said separation vessel being connected by a fluid discharge conduit to the top of said reaction zone in said high pressure vessel and being connected by a particulate solid discharge conduit to a point at the bottom of said reaction zone, said discharge conduit having an outlet at the upper portion of said separation vessel, said admixture being withdrawn from said reaction zone while keeping said fluid discharge conduit and said particulate solid discharge conduit open and while maintaining the admixture in said solid separation vessel at a pressure substantially in the order of said high pressure vessel, (2) settling said solid in said separation vessel, the pressure produced at the outlet of the particulate solid discharge conduit being greater than the pressure in the fluid discharge conduit, (3) recycling the separated liquid to the upper portion of said high pressure vessel through said fluid discharge conduit, until a predetermined amount of said solid has accumulated in said separation vessel, (4) discontinuing said withdrawal of said admixture from said high pressure vessel and said recycle of the liquid to said high pressure vessel by closing both the particulate solid discharge conduit and the fluid discharge conduit, (5) reducing the pressure in said solid separation vessel to atmospheric pressure and (6) recovering the particulate solid accumulated in said separation vessel.

2. The method as defined in claim 1 wherein the pressure of said high pressure vessel is 30–350 kg./cm.$^2$.

3. The method as defined in claim 1 wherein the diameter of said particulate solid is on the order of 0.05–10.0 mm.

4. The method as defined in claim 1 wherein said particulate solid is a catalyst employed in the hydrodesulfurization of heavy oil which proceeds at 250°–500° C. and 100–350 kg./cm.$^2$.

References Cited

UNITED STATES PATENTS

| | | | |
|---|---|---|---|
| 2,930,748 | 3/1960 | Montgomery et al. | 208—211 |
| 2,506,307 | 5/1950 | Martin | 208—149 |
| 3,008,896 | 11/1961 | Lawson | 208—149 |
| 2,446,247 | 8/1948 | Scheineman | 208—149 |
| 2,517,042 | 8/1950 | Skelly | 208—164 |
| 2,833,699 | 5/1958 | Dicks | 208—150 |

FOREIGN PATENTS

| | | | |
|---|---|---|---|
| 736,072 | 8/1955 | England | 208—213 |

PAUL M. COUGHLAN, JR., Primary Examiner

G. J. CRASANAKIS, Assistant Examiner

U.S. Cl. X.R.

208—153; 210—265, 268